Dec. 2, 1924. 1,517,716
V. DUTKIEWICZ
CHAIN TRACK FOR TRACTORS AND THE LIKE
Filed March 29, 1922 3 Sheets-Sheet 1

Inventor:
V. Dutkiewicz
By Lawrence Langner
Atty.

Dec. 2, 1924.  
V. DUTKIEWICZ  
1,517,716  
CHAIN TRACK FOR TRACTORS AND THE LIKE  
Filed March 29, 1922  3 Sheets-Sheet 2

Inventor:  
V. Dutkiewicz  
By Lawrence Langner  
Atty

Dec. 2, 1924.
V. DUTKIEWICZ
1,517,716
CHAIN TRACK FOR TRACTORS AND THE LIKE
Filed March 29, 1922     3 Sheets-Sheet 3
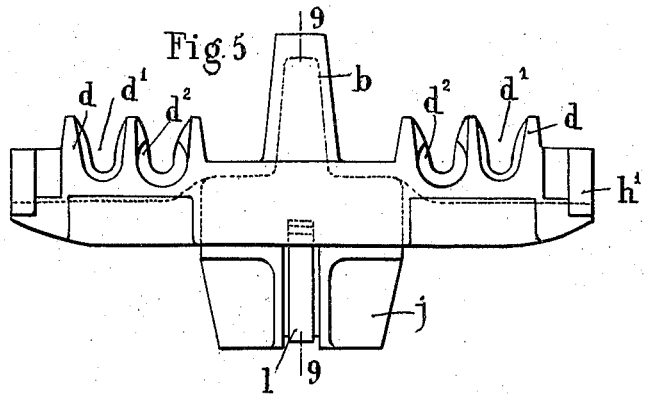
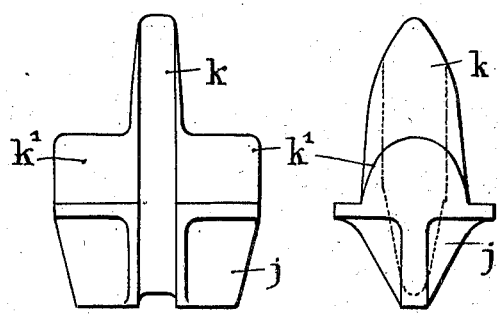
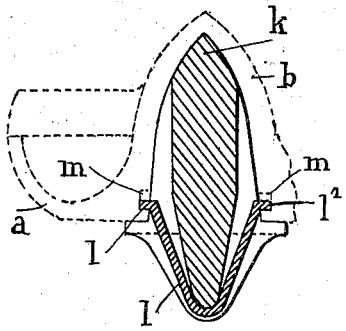
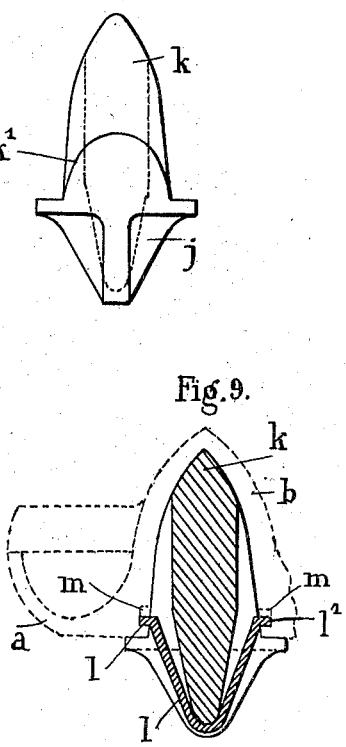
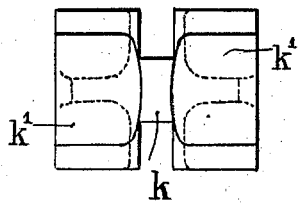
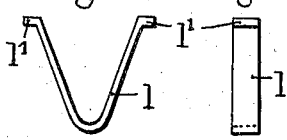
Inventor:
V. Dutkiewicz
By Lawrence Languer
Atty.

Patented Dec. 2, 1924.

1,517,716

UNITED STATES PATENT OFFICE.

VALENTIN DUTKIEWICZ, OF PARIS, FRANCE.

CHAIN TRACK FOR TRACTORS AND THE LIKE.

Application filed March 29, 1922. Serial No. 547,841.

*To all whom it may concern:*

Be it known that I, VALENTIN DUTKIEWICZ, citizen of the French Republic, residing at Paris, France, have invented new and useful Improvements in Chain Tracks for Tractors and the like; and I do hereby declare the following to be a full, clear, and exact description of the same.

The present invention relates to improvements in chain tracks for tractors and the like, of the kind in which the different elements of the chain track are connected together by portions of cable.

The said improvements more particularly concern the connection of the different elements of the chain track by said cable portions, and the arrangement of the cable-portions in two parallel rows or in an even number of parallel rows.

The invention relates also to the method of fixing the ends of the cables upon each element of the chain track so as to obtain rapid taking down.

The annexed drawings represent by way of example one form of construction of the chain track according to the invention.

Figure 5 is an elevation of one element of the chain track.

Figure 6 is a detail in elevation.

Figure 7 is the corresponding edge view.

Figure 8 is a plan view corresponding to Figure 6.

Figure 9 is a section on line 9—9 of Figure 5.

Figures 10 and 11 are detail views in elevation.

Figure 1:
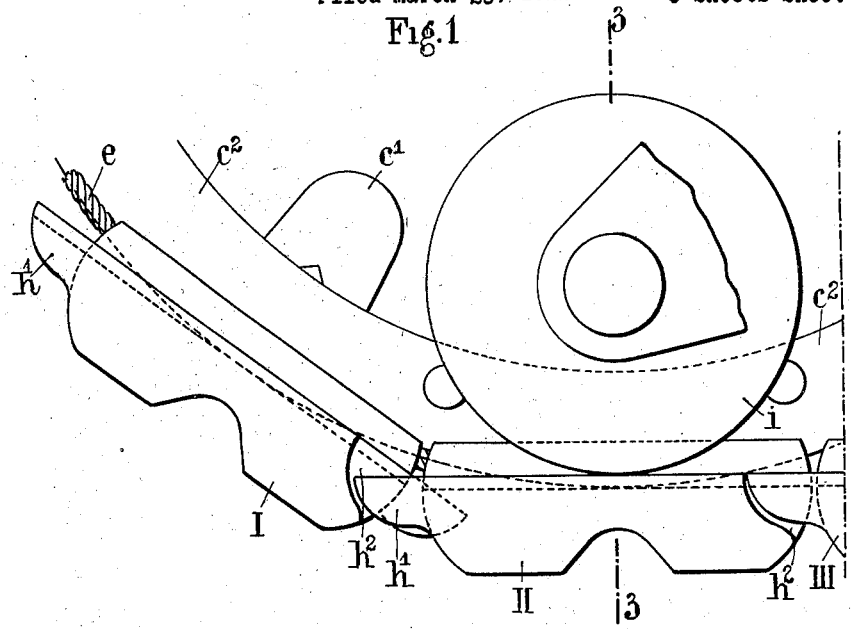
Figure 1 is an elevation of a portion of the track.
Figure 2:
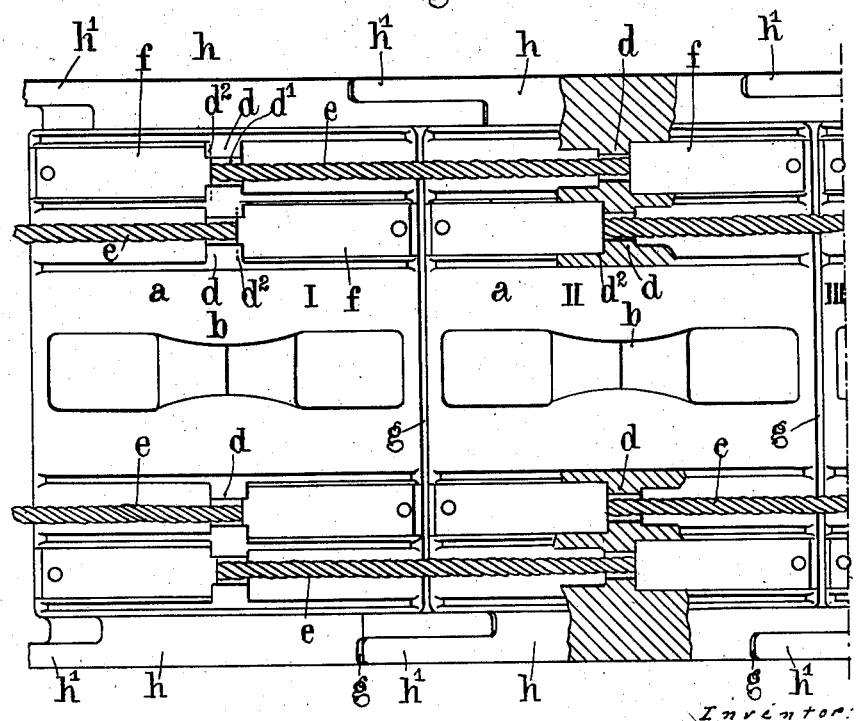
Figure 2 is a corresponding plan view parts being shown in section.
Figure 3:
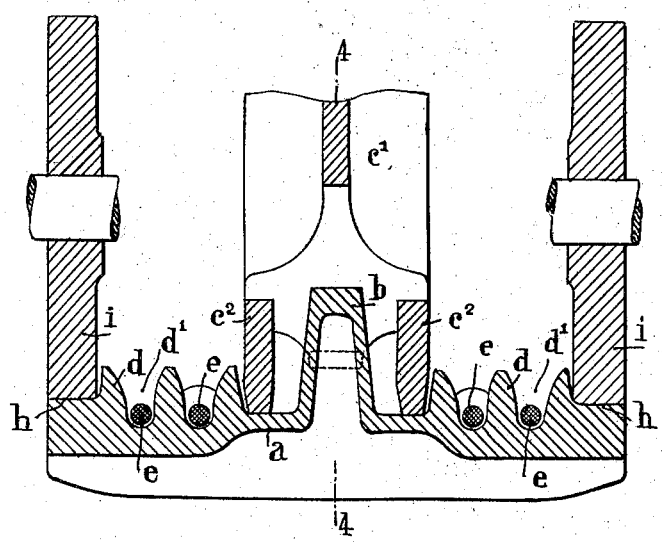
Figure 3 is a section upon line 3—3 of Figure 1.
Figure 4:
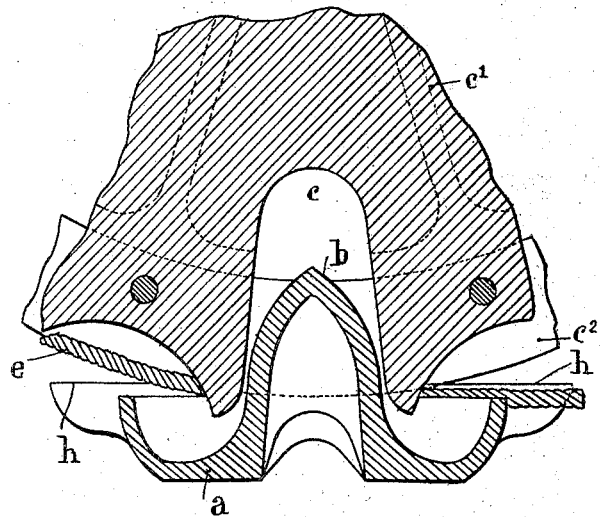
Figure 4 is a section upon line 4—4 of Figure 3.

Each element I, II, III, . . . of the chain track consists of a shoe $a$ (Figures 3, 4 and 5), provided in its central longitudinal plane with a projection $b$ which engages in a recess $c$ of corresponding shape in the driving wheel $c^1$. Upon its inner face, the shoe $a$ is provided, on either side of the central longitudinal plane, with a transverse central rib $d$; each rib is provided with two longitudinal notches $d^1$ opening inward of the chain-track. Each rib $d$ is also provided, on each face, with a part circular recess $d^2$.

The lengths of cable $e$ intended for connecting the elements I, II, III, . . . with one another, are provided at their ends with sleeves $f$ fixed upon these cables in any convenient manner. The cables $e$ pass through the notches $d^1$, and the sleeves or thimbles $f$ engage at one end in the seatings $d^2$ of the ribs $d$. The length of the cables $e$ in relation to that of the elements of the chain track is selected in such a way that after assembly there exists between each adjacent pair of elements a clearance $g$ the width of which is somewhat greater than the depth of the seating recess $d^2$; it is thus possible by bringing together two adjacent elements until they touch, to disengage a sleeve $f$ from its recess $d^2$ and thereby to disconnect with great facility one or more elements of the chain track.

As shown, there are thus provided, on either side of the central longitudinal plane of the chain-track two rows of lengths of cable, and the cable lengths $e$ of one row are staggered relatively to the cable lengths of the other row, on the same side of the central longitudinal plane of the chain-track. As a result of the construction described in spite of the points of attachment, the wrapping of the cables around the driving wheel is effected just as if they were free cables, giving very low resistance to the wrapping movement. It is convenient for obtaining the wrapping of the cables without float or undue tension, that the pitch circumference of the teeth formed by the projections $b$ and the recesses $c$ shall coincide in projection with the axis of the cables when they are wrapped upon the driving wheel.

Each element comprises laterally a plane portion $h$ upon which rollers $i$ travel, these rollers transmitting the weight of the vehicle. These plane portions are extended in one direction by a lug $h^1$ and comprise in the opposite direction a recess $h^2$ into which the lug $h^1$ of the adjacent element fits. The passage of the rollers $i$ from one element to the next thus takes place without any break of continuity. These lugs $h^1$ have also for object to prevent lateral displacements of the elements in relation to one another, thus obviating any nipping or shearing of the cables.

This arrangement of the supporting cables on both sides of the driving wheel allows of giving the wheel itself a very narrow width, since it serves only for the driving of the track. It can therefore consist of a central apertured web $c^1$ reinforced by two lateral rings $c^2$ so that there is never any danger of the accumulation of earth or the like between the elements of the chain track and the wheel, as is the case in other known devices.

The central projection $b$ of each shoe $a$ is hollow (see Figures 3, 4 and 9), so that this cavity can be utilized for securing upon each element, in case of necessity, a spud or grouser $j$ of which the shape is illustrated in Figures 6, 7, 8 and 9; this spud $j$ has a tail $k$ fitting exactly within the hollow part of the projection $b$ and two arched or convex parts $k^1$ by means of which it bears against the shoe $a$. Lastly in its central longitudinal plane, this spud is provided with a groove in which is fitted a spring $l$ of V shape the ends of which are turned outwardly to engage in notches $m$ formed on the internal faces of the projection $b$. This spring is designed to keep the spud or grouser $k$ in position, and by reason of its elasticity it can be fitted or removed rapidly so that the attachment and the detachment of the spuds $k$ will be very easy.

As a result of these arrangements, there is provided a chain track of very simple construction, of very ready assembly and demounting, and therefore of very easy upkeep. The use of cables in place of pivotal joints for connecting the elements of the chain track together, allows of increasing the efficiency of the apparatus because the resistance offered by the chain track to its wrapping around the driving wheels and unwrapping therefrom is of insignificant magnitude.

It will be understood that the invention is not limited to the details of construction which have been described; thus for example, in accordance with the power to be transmitted there may be provided several lengths or rows of cables for connecting the different elements together, as well as several projections upon the track shoes, the driving wheels having naturally a corresponding number of recesses. These recesses might evidently also be provided in the track shoes and the projections upon the driving wheel.

What I claim is:

1. A chain-track for tractors, comprising, in combination, a plurality of chain-track elements, a plurality of cables connecting said elements together and arranged on the inner faces of the chain-track elements, in an even number of parallel rows, and on either side of the central longitudinal plane of the chain-track and arranged symmetrically with respect to said plane, each of said cables comprising a plurality of independent cable lengths, the cable lengths constituting one cable being staggered relatively to the cable lengths of an adjacent cable located on the same side of the central longitudinal plane of the chain-track, each cable length being connected at its ends to two adjacent chain-track elements, independently of the other cable lengths.

2. A chain-track for tractors, comprising, in combination, a plurality of chain-track elements, a plurality of cables connecting said elements together and arranged on the inner faces of the chain-track elements, in an even number of parallel rows, on either side of the central longitudinal plane of the chain track and arranged symmetrically with respect to said plane, each of said cables comprising a plurality of independent cable lengths, the cable lengths constituting one cable being staggered relatively to the cable lengths, of an adjacent cable located on the same side of the central longitudinal plane of the chain-track, each cable length being connected at its ends to two adjacent chain-track elements, independently of the other cable lengths, the connection of the cable lengths being substantially in the transverse central plane of each of said chain-track elements.

3. A chain-track for tractors, comprising in combination a plurality of chain-track elements, a plurality of cables connecting said elements together and arranged on the inner face of the chain-track elements, in an even number of parallel rows on either side of the central longitudinal plane of the chain-track and arranged symmetrically with respect to said plane, each cable comprising a plurality of independent cable lengths, the cable lengths of one cable being staggered relatively to the cable lengths of an adjacent cable located on the same side of the central longitudinal plane of the chain-track, recesses provided in the chain-track elements, sleeves secured to the ends of each of the cable lengths and formed to be loosely mounted in said recesses for connecting the cable lengths to the chain-track, the points of attachment of the cable lengths to their sleeves being located substantially in the transverse central planes of the corresponding chain-track elements.

4. A chain-track for tractors, comprising, in combination, a plurality of chain-track elements, a plurality of cables connecting said elements together and arranged on the inner face of the chain-track elements, in an even number of parallel rows, on either side of the central longitudinal plane of the chain-track and arranged symmetrically with respect to said plane, each cable comprising a plurality of independent cable lengths, the cable lengths of one cable being staggered relatively to the cable lengths, of an adjacent cable located on the same side of the central longitudinal plane of the chain-track recesses provided in the chain-track elements, sleeves secured to the ends of each of the cable lengths and formed to be loosely mounted in said recesses, the points of attachment of the cable lengths to their sleeves being located substantially in the transverse central planes of the corresponding adjacent chain-track elements, transverse ribs provided on the inner face of each chain-track element, and longitudinal grooves provided in said transverse ribs in the planes of the cable-rows, said notches opening inwardly of the chain-track and formed to receive the cable lengths.

In testimony whereof, I have signed my name to this specification in the presence of two subscribing witnesses.

VALENTIN DUTKIEWICZ.

Witnesses:
T. ARMENGAUD AÎNÉ,
P. ARMENGAUD.